July 14, 1925.
F. A. SELLINGER ET AL
1,545,702
DISPENSING DEVICE FOR EVAPORATED MILK AND THE LIKE
Filed Sept. 17, 1924
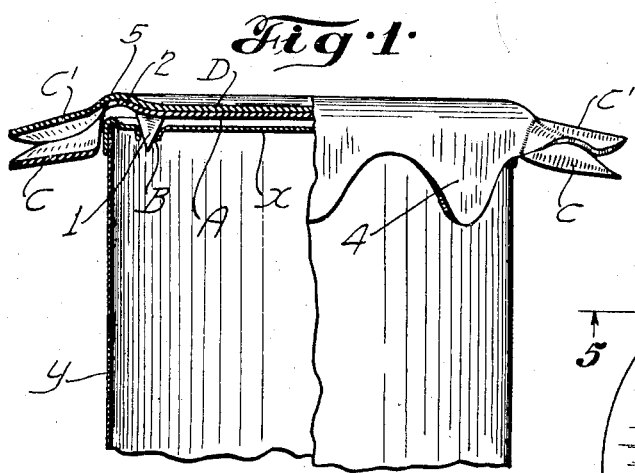
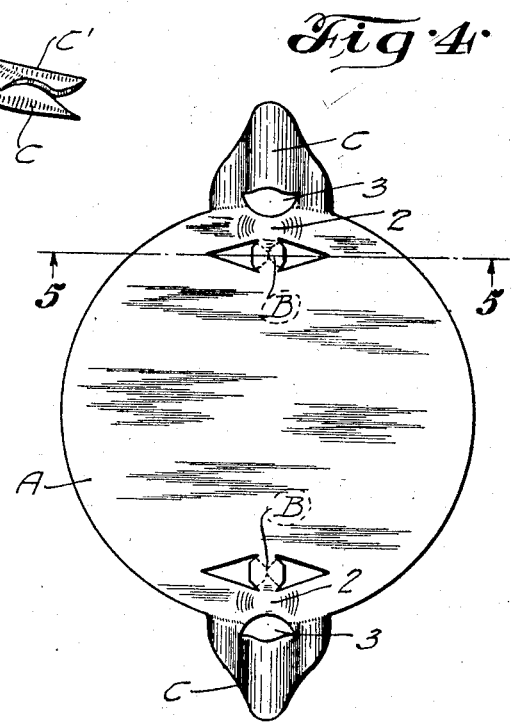
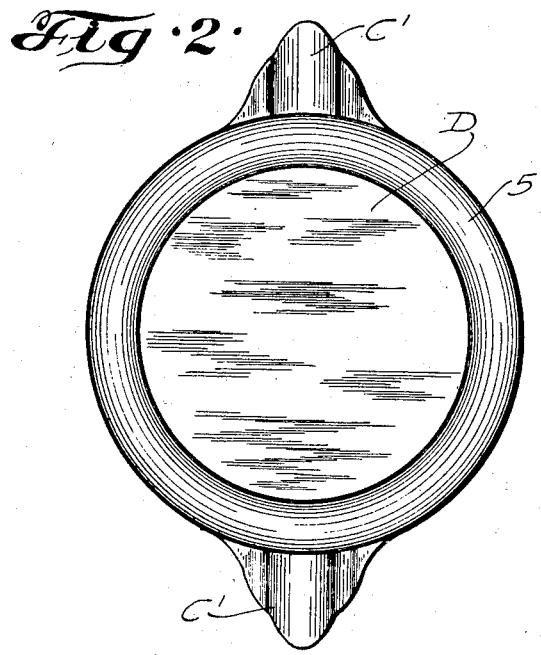
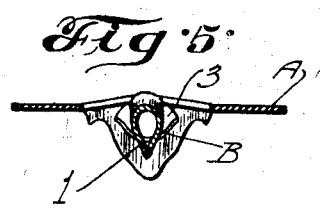
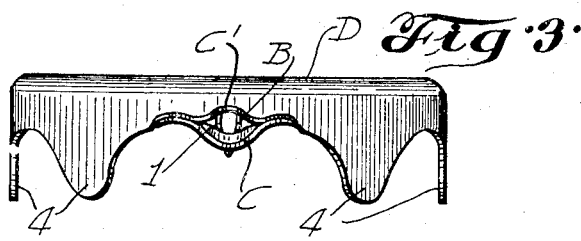
INVENTORS
Franklin A. Sellinger.
LeRoy R. Klingler.
BY Bakewell
ATTORNEYS Patented July 14, 1925.

1,545,702

UNITED STATES PATENT OFFICE.

FRANKLIN A. SELLINGER AND LE ROY R. KLINGLER, OF ST. LOUIS, MISSOURI.

DISPENSING DEVICE FOR EVAPORATED MILK AND THE LIKE.

Application filed September 17, 1924. Serial No. 738,163.

*To all whom it may concern:*

Be it known that we, FRANKLIN A. SELLINGER and LE ROY R. KLINGLER, citizens of the United States, residing in the city of St. Louis, State of Missouri, have invented a certain new and useful Improvement in Dispensing Devices for Evaporated Milk and the like, of which the following is a full, clear, and exact description, such as will enable others skilled in the art to which it appertains to make and use the same.

This invention relates to devices of the kind that are used for dispensing evaporated milk and similar products from the cans in which such products are sold to the public.

The main object of the invention is to provide an inexpensive device of the kind referred to which is so designed that evaporated milk or a similar product can be poured from a can without liability of the milk collecting on the top of the can or running down over the side of the can.

Another object is to provide a sanitary device of the kind referred to that is of attractive appearance and of such design that the operation of applying it to a can causes a hole to be formed in the top of the can at a point in proximity to a lateral discharge spout on the device into which the contents of the can can be directed by tilting the can. Other objects and desirable features of our invention will be hereinafter pointed out.

Figure 1 of the drawings is a side elevational view, partly in vertical section of a dispensing device constructed in accordance with our invention arranged in operative position on a can that contains evaporated milk or a similar product.

Figure 2 is a top plan view of the device.

Figure 3 is a side elevational view.

Figure 4 is a top plan view of the member of the device which carries the punches and the bottom portions of the lateral discharge spouts; and Figure 5 is a transverse sectional view, taken on the line 5—5 of Figure 4, looking in the direction indicated by the arrows.

In the drawings which illustrate the preferred form of our invention, A designates a flat, disk-shaped member that is provided with one or more punches B that are used to form holes in the top $x$ of the can on which the device is used and one or more laterally-projecting spout portions C through which the contents of the can can be poured by tilting the can. In the form of our invention herein illustrated the member A is provided with two punches B arranged so as to form holes in the top of the can at points in proximity to the side wall $y$ of the can and two spout portions C located adjacent said punches and preferably inclined downwardly slightly, as shown in Figure 1. When the device is arranged in operative position on a can, the peripheral edge portion of the member A will bear snugly against the bead at the edge of the top $x$ of the can, thus causing the main body portion of the member A to be spaced away slightly from the main body portion of the top $x$ of the can, and thus providing a space through which the contents of the can can flow laterally from the hole in the top formed by one of the punches B towards the adjacent spout portion C, when the can is tilted.

The punch or punches B can be constructed in various ways without departing from the spirit of our invention, but we prefer to form each of said punches in such a manner that after it has been forced downwardly through the top of the can, it will virtually act as a conduit that directs the contents of the can over the top of the can and towards the adjacent spout portion C during the pouring operation. Thus, as shown more clearly in Figures 4 and 5, each of the punches B is produced by severing the member A so as to form two triangular-shaped prongs 1 which thereafter are bent downwardly towards each other so as to form a punch that can be easily forced through the top $x$ of the can by exerting downward pressure on the member B. When the device is arranged in operative position on the can and two opposed prongs 1 that constitute each of the punches B extend slightly above the top of the can, and thus virtually serve as the side walls of a conduit through which the contents of the can flows when the can is tilted. In other words, the prongs 1 not only form a hole in the top of the can through which the contents of the can can escape when the can is tilted, but in view of the fact that said prongs are spaced apart at the point where they are joined to the member A, they direct the contents of the can towards the adjacent spout portion C, and thus prevent the contents from spreading out in all directions over the outside face of the top of the can, as might occur if the punch were not provided with portions that bear against two opposed edges of the hole formed in the top of the can by the punch. The prongs 1, if desired, can be curved slightly in cross section so as to impart strength and rigidity to the same and said prongs are preferably curved or bulged slightly adjacent the points where they are connected to the member A, so as to form a punch, which, after penetrating the top of the can, will enlarge the hole formed by the end of the punch by spreading the metal at the edges of said hole downwardly in such a way as to form a rectangular-shaped hole of considerably greater area than the end of the punch.

Each of the spout portions C on the member A is so shaped that when said member is arranged in operative position on a can the concavo-convex part of said spout portion will be positioned at a point below the bead on the upper end of the can and will project laterally and downwardly from the side wall of the can, as shown more clearly in Figure 1, thus forming a discharge spout whose inner end bears snugly enough against the side of the can to prevent the contents of the can from running down over the side of the can during the pouring operation. The portions 2 of the member A lying between the punches B and the spout portions C are separated from the spout portions C by slits and the material constituting said portions is bent upwardly or in an opposite direction to the concavo-convex part of the spout portions C so as to form holes 3, as shown in Figure 4, through which the contents of the can can escape laterally into one or the other of the spout portions C when the can is tilted during the pouring operation. In other words, the parts 2 of the member A that lie between the hollow punches B which project downwardly through the top of the can and the laterally-projecting spout portions C at the sides of the can are bent upwardly so as to be spaced far enough away from the bead at the upper edge of the can to permit the contents to flow over said bead into the spout portion C when the can is tilted during the pouring operation.

In order to produce a dispensing device that is sanitary and of attractive appearance, a cap member D is combined with the member A in such a way as to completely conceal said member A and close the holes in said member produced by utilizing portions of said member A to form the punches B. The cap member D is provided at its peripheral edge with a depending flange 4 either scalloped or of uniform depth that surrounds the upper end portion of the can, and said cap member is also provided with spout portions C' that co-operate with the spout portions C on the member A to form two substantially tubular discharge spouts. The side edges of the spout portions C and C' on the members A and D, respectively, are curved slightly, as shown in Figure 3, so that the top portions C' of the discharge spouts will bear snugly enough against the bottom portions C of said spouts to prevent the material flowing through said spouts from escaping laterally through the joints between said parts, and the cap member D is preferably provided at its periphery with a pressed rib or bead 5 of annular form that imparts an ornamental appearance to the cap member D and also provides sufficient clearance for the upwardly bent portions 2 of the member A to insure said member A lying flat against the underside of the cap member when the device is applied to a can. Due to the fact that the portions 2 of the member A project upwardly into the bead or rib 5 on the cap member D, there is little liability of the contents of the can finding its way into the space formed by the bead or rib 5 and working around the same.

In practice the members A and D are usually formed from sheet metal stampings, and said members are not permanently connected together, as it is highly desirable that the parts of a device which is used for dispensing evaporated milk and similar products may be easily separated for cleansing; the device is inexpensive to manufacture; it is of neat and attractive appearance; it can be applied easily to a can simply by slipping it over the upper end of the can and then pressing it downwardly so as to force the punches B through the top of the can, and it is so constructed that the contents of the can can be poured through one of the discharge spouts without liability of the contents spreading out over the top of the can and dripping down over the side of the can.

Having thus described our invention, what we claim as new and desire to secure by Letters Patent is:

1. A dispensing device for cans containing evaporated milk and similar products, comprising a member that is adapted to be mounted on the bead at the upper edge of the can, a laterally-projecting spout portion on said member whose inner end is positioned below the bead on the can, a punch on said member arranged adjacent said spout portion and constructed so as to serve as a conduit that directs the contents of the can towards said spout portion when the can is tilted to discharge the contents of same, and a cap member extending over said punch-carrying member and provided with a co-operating spout portion arranged above the spout portion on said punch-carrying member.

2. A dispensing device for cans containing evaporated milk and similar products, composed of a cap member adapted to be mounted on the upper end of a can and provided with a laterally-projecting spout portion, a substantially disk-shaped member arranged inside of said cap member and provided with a co-operating spout portion, and a punch on said disk-shaped member for forming a hole in the top of the can, the part of said disk-shaped member lying between said punch and the spout portion on said member being bent upwardly so as to permit the contents of the can to escape through the hole in the top of the can and flow over said top into the spout formed by the co-operating spout portions on said members.

3. A dispensing device for cans containing evaporated milk and similar products composed of two substantially disk-shaped members arranged in superimposed relation, a flange or depending portion on the top member that surrounds the upper end of the can on which the device is used, co-operating spout portions on said members that project laterally from same, and a punch on the bottom member arranged adjacent the spout portion of same and formed by two opposed prongs spaced apart at their upper ends and inclined inwardly towards their lower ends.

4. A dispensing device for cans containing evaporated milk and similar products composed of two substantially disk-shaped members arranged in superimposed relation, a flange or depending portion on the top member that surrounds the upper end of the can on which the device is used, co-operating spout portions on said members that project laterally from same, a punch on the bottom member arranged adjacent the spout portion of same and formed by two opposed prongs spaced apart at their upper ends and inclined inwardly towards their lower ends, a pressed, raised bead or rib on the top member, and an upwardly-pressed portion on the bottom member between the punch and the spout portion of said member that is normally positioned in the bead on said top member.

FRANKLIN A. SELLINGER.
LE ROY R. KLINGLER.